March 11, 1952     E. P. SELANDER     2,588,939
SAFETY-LOCKED FOLDING SHEARS
Filed Feb. 8, 1950
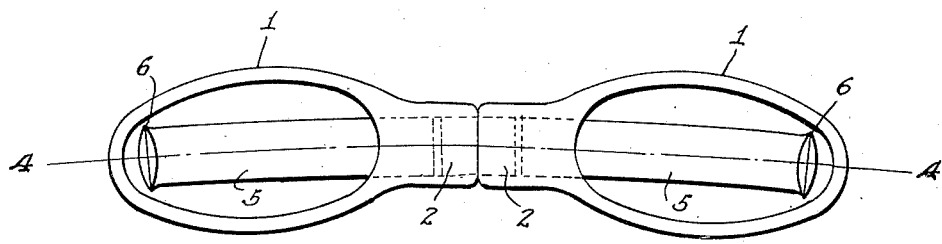
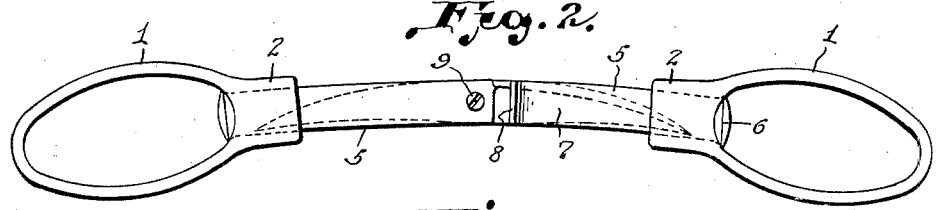
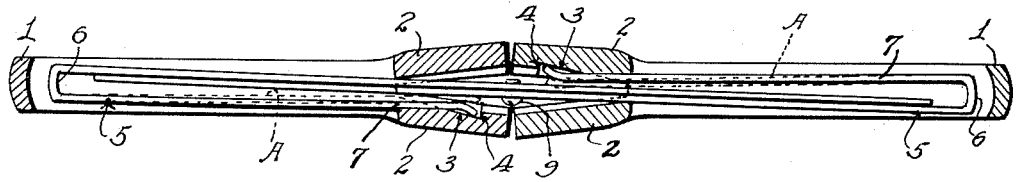
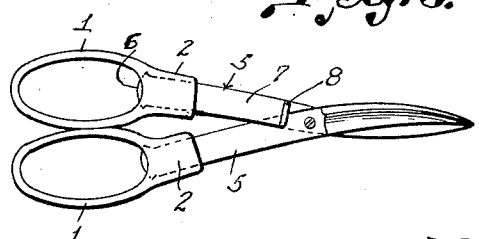
INVENTOR,
Edwin P. Selander
BY
E. E. Vrooman & Co.,
ATTORNEYS.

Patented Mar. 11, 1952

2,588,939

UNITED STATES PATENT OFFICE 2,588,939

SAFETY-LOCKED FOLDING SHEARS

Edwin P. Selander, Perkins, Mich.

Application February 8, 1950, Serial No. 143,067

2 Claims. (Cl. 30—255)

This invention relates to a safety-locked folding shears or scissors.

An object of the invention is to provide an efficient lock for preventing the shears being accidentally opened when folded.

It has been found in practice that when the old type of shears known prior to this invention is folded, it works to an unfolded position, which causes damage to the pocket or the pocketbook. Therefore, another object of this invention is the provision of novel locking sockets in the lips of the shears that automatically receive portions of the blades when the shears are adjusted to a closed or folded position, thereby preventing not only the shears being accidentally opened, but also prevents the shears from being opened until the operator presses certain portions of the blades to unlock the blades so that the shears can be adjusted to an operative position.

A still further object of this invention is the production of a folding shears or scissors with elongated oval eyes or sheaths which will accommodate relatively long curved blades, in combination with the other novel elements of this invention.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of the scissors or shears in a folded position.

Figure 2 is a view in side elevation of the scissors or shears in an extended position, prior to turning the blades or shanks for extending outwardly the curved cutting blades.

Figure 3 is a top plan view of the shears in an extended position, similar to Fig. 2.

Figure 4 is a longitudinal sectional view, taken on line 4—4, Fig. 1.

Figure 5 is an elevated side view of the shears in an opened, operative condition.

Referring to the drawings in which the preferred embodiment of this invention is illustrated, 1, 1 designates eyes that act as sheaths. Each eye 1 is in the form of an elongated oval, for the purpose hereinafter specified. On the inner end of each eye 1 are two lips 2. In one of each set of lips 2 is formed a locking recess or socket 3. This socket 3 has an inclined bottom and a right angular shoulder 4.

There are two curved blades 5, and each blade 5 has an enlarged head 6, Fig. 1, at its inner end to prevent the blade from being removed entirely from the eye 1. Each blade 5 is provided with a spring tongue 7. On the outer end of the tongue 7 is an outwardly curved portion 8, which is adapted to snap into the locking socket 3 when the shears is in a folded position, Fig. 1. The two blades 5 are pivotally connected at 9, which is illustrated as a screw.

It is to be noted that the blades 5 are curved, and the elongated eyes 1 receive these curved blades when the shears is in a closed position, which would not be possible if the eyes were of the common round type. By this construction, a much longer cutting edge is obtained, for a more efficient operation than would be the case if the blades were straight.

When the blades are extended, Fig. 2, and the operator proceeds to close the shears, the outwardly curved end 8 of the spring tongues will snap into the locking sockets, whereby the said ends 8 may engage the shoulders 4, thereby preventing the shears from working to an open position, until the operator presses inwardly upon the spring tongues, as illustrated by dotted lines A, Fig. 4, causing the ends 8 to clear the locking sockets 3, whereupon the shears can be adjusted to first an open position and then to the operative position, as shown in Fig. 5.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a safety-locked folding shears, the combination of a pair of eyes, each eye provided with a set of lips, one of said lips in each set being provided with a recess on its inner face, a pair of blades having shanks movable into and out of said eyes, each blade provided with a tongue, and each tongue having at its outer end an offset portion adapted to snap into said recess, whereby the blades are retained in a closed or folded position against accidental displacement.

2. In a safety-locked folding shears, the combination of a pair of eyes, each eye provided with a set of two lips, one of the lips in each set being provided with a locking socket having an inclined bottom and a right-angular shoulder, blades provided with shanks slidably mounted to move into and out of said eyes, and a tongue on each of said blades provided with an outwardly extending end seated in said locking socket with its outer end adapted to press against said shoulder when the shears are in a closed or folded position.

EDWIN P. SELANDER.

REFERENCES CITED

The following references are of record in the file of this patent:

UNITED STATES PATENTS

| Number | Name | Date |
|---|---|---|
| 1,090,130 | Borgetti | Mar. 17, 1914 |

FOREIGN PATENTS

| Number | Country | Date |
|---|---|---|
| 208 | Great Britain | Jan. 16, 1877 |